(12) United States Patent
Okumura et al.

(10) Patent No.: US 9,376,737 B2
(45) Date of Patent: Jun. 28, 2016

(54) METHOD FOR PRODUCING ZINC ALLOY

(71) Applicant: HONDA MOTOR CO., LTD., Tokyo (JP)

(72) Inventors: Tokuji Okumura, Tochigi (JP); Taisei Wakisaka, Tochigi (JP); Masahito Mutou, Tochigi (JP); Taiji Mizuta, Fukui (JP); Yasunari Mizuta, Fukui (JP); Shinji Saeki, Fukui (JP); Hiroyasu Taniguchi, Fukui (JP); Yoshiaki Ito, Fukui (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/783,471

(22) PCT Filed: Apr. 9, 2014

(86) PCT No.: PCT/JP2014/060327
§ 371 (c)(1),
(2) Date: Oct. 9, 2015

(87) PCT Pub. No.: WO2014/168183
PCT Pub. Date: Oct. 16, 2014

(65) Prior Publication Data
US 2016/0053347 A1    Feb. 25, 2016

(30) Foreign Application Priority Data

Apr. 12, 2013   (JP) .................................. 2013-084108

(51) Int. Cl.
*B22D 21/00*   (2006.01)
*B23K 35/40*   (2006.01)
(Continued)

(52) U.S. Cl.
CPC ... *C22C 1/02* (2013.01); *B22D 1/00* (2013.01); *B22D 7/005* (2013.01); *B22D 21/00* (2013.01);
(Continued)

(58) Field of Classification Search
CPC ........ B22D 1/00; B22D 21/00; B22D 21/027; B23K 35/40
USPC ..................... 164/5.1, 57.1, 91, 97
See application file for complete search history.

(56) References Cited

U.S. PATENT DOCUMENTS

| 4,675,157 | A | 6/1987 | Das et al. |
| 8,051,892 | B2 * | 11/2011 | Arai ........................ C22C 47/04 164/91 |
| 2011/0020666 | A1 * | 1/2011 | Wakisaka ................. B23K 1/14 428/650 |

FOREIGN PATENT DOCUMENTS

| CN | 1876872 | 12/2006 |
| JP | 61-96046 | 5/1986 |

(Continued)

OTHER PUBLICATIONS

International Search Report, Date of mailing: Jun. 10, 2014.

*Primary Examiner* — Kevin E Yoon
(74) *Attorney, Agent, or Firm* — Rankin, Hill & Clark LLP

(57) ABSTRACT

Provided is a method for producing a zinc alloy capable of obtaining a Zn—Si alloy having a uniform composition. Metal Zn is melted in a crucible (2) provided in a heating furnace (1) to obtain a Zn molten metal (4). Floating of a metal Si powder (6) added to the Zn molten metal (4) is suppressed by a floating suppressing member (5). Heating is performed while a liquid surface of the Zn molten metal (4) is coated with a carbonaceous material (9), thereby melting the metal Si powder (6). The suppression of the floating of the metal Si powder (6) is released to allow the melted Si to be dispersed in the Zn molten metal (4), thereby obtaining a Zn—Si alloy molten metal (11). A copper casting mold (12) is filled with the Zn—Si alloy molten metal (11), and is rapidly cooled down to obtain a billet.

8 Claims, 4 Drawing Sheets

(51) Int. Cl.
    *C22C 1/02* (2006.01)
    *C22C 18/00* (2006.01)
    *B23K 35/28* (2006.01)
    *B22D 1/00* (2006.01)
    *B22D 7/00* (2006.01)
    *B22D 21/02* (2006.01)

(52) U.S. Cl.
    CPC ............ *B22D 21/027* (2013.01); *B23K 35/282* (2013.01); *B23K 35/40* (2013.01); *C22C 18/00* (2013.01)

(56) References Cited

FOREIGN PATENT DOCUMENTS

| | | | |
|---|---|---|---|
| JP | 04046695 A | * | 2/1992 |
| JP | 2010-099739 | | 5/2010 |
| JP | 4962907 | | 4/2012 |
| JP | 2013-510943 | | 3/2013 |

* cited by examiner

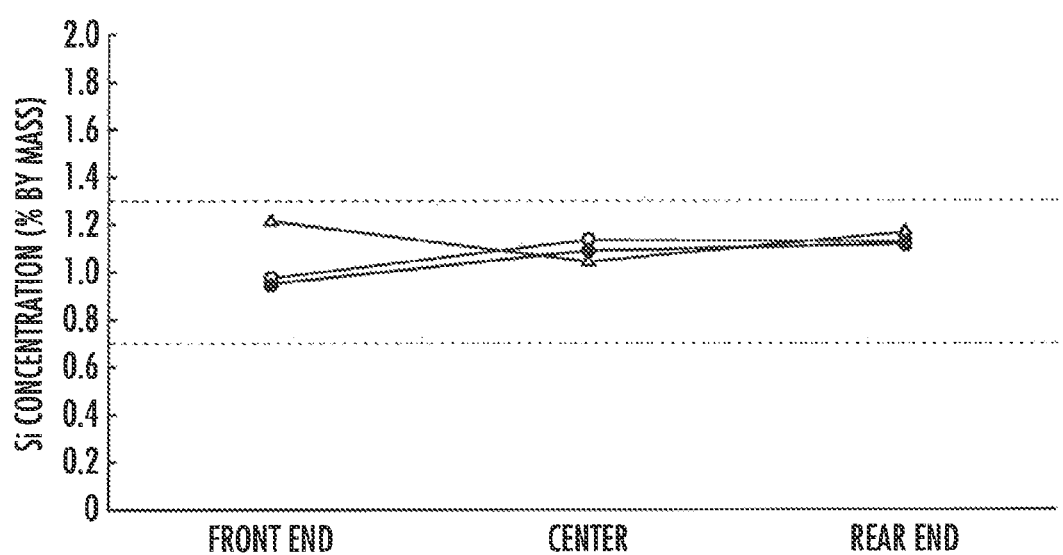

METHOD FOR PRODUCING ZINC ALLOY

TECHNICAL FIELD

The present invention relates to a method for producing zinc alloy that can be used in a brazing material for bonding an iron-based metallic member and an aluminum-based metallic member.

BACKGROUND ART

Conventionally, there is known a method in which zinc or zinc alloy is interposed between an iron-based metallic member such as steel and an aluminum-based metallic member such as aluminum alloy, and heating is performed to bond both of the members (for example, refer to Patent Document 1).

In addition, it is proposed to use brazing material formed from Zn—Si alloy as the zinc alloy (for example, refer to Patent Document 2).

CITATION LIST

Patent Document

Patent Document 1: Japanese Patent No. 4962907
Patent Document 2: Japanese Patent Publication No. 2010-99739 A

DISCLOSURE OF THE INVENTION

Problem to be Solved by the Invention

However, the melting point of Si is 1414° C., and the boiling point of Zn is 907° C., and thus there is a problem in that during production of Zn—Si alloy, when a metal Si powder is melted through heating, Zn molten metal is vaporized due to heat during the heating, and Zn is lost.

On the other hand, when an amount of metallic Si, which is added, with respect to the Zn molten metal is adjusted, it is possible to melt the metal Si powder while vaporization of the Zn molten metal is suppressed. However, even in this case, the specific gravity of Si is smaller than that of Zn, and Si is lighter than Zn. Accordingly, when the metal Si powder is added to the Zn molten metal, there is a problem in that the metal Si powder floats in the vicinity of a liquid surface of the Zn molten metal and exists unevenly, and thus it is difficult to attain uniform mixing.

The invention has been made to solve the problem, and an object thereof is to provide a method for producing zinc alloy which is capable of obtaining Zn—Si alloy having an uniform composition.

Means for Solving Problem

To accomplish the object, according to an aspect of the invention, there is provided a method for producing zinc alloy in which Si is contained in Zn. The method includes: a process of heating metal Zn in a crucible provided in a heating furnace to melt the metal Zn so as to obtain a Zn molten metal; a process of adding a metal Si powder to the Zn molten metal in an amount capable of being melted at a temperature equal to or lower than the boiling point of Zn, and heating the resultant mixture to melt the metal Si powder in a state in which floating of the metal Si powder is suppressed by a floating suppressing member that is displaceable at the inside of the crucible, and a liquid surface of the Zn molten metal is coated with a carbonaceous material; a process of releasing the suppression of the floating of the metal Si powder by the floating suppressing member to allow the melted Si to be dispersed in the Zn molten metal so as to obtain a Zn—Si alloy molten metal; and a process of filling a casting mold with the Zn—Si alloy molten metal, and rapidly cooling down the Zn—Si alloy molten metal so as to obtain a billet.

In the production method of the invention, first, the metal Zn is melted in the crucible provided in the heating furnace. At this time, materials that exist in the crucible are Zn and inevitable impurities, and Zn can be substantially regarded as the material. Accordingly, when an inside of the crucible is heated by the heating furnace to keep the inside to a temperature equal to or higher than 420° C. that is the melting point of Zn, the metal Zn can be melted, thereby obtaining the Zn molten metal.

Next, the metal Si powder is added to the Zn molten metal, and then the metal Si powder is melted. Here, the melting point of Si alone is 1414° C., and this melting point is a temperature exceeding 907° C. that is the boiling point of Zn. However, in the Zn—Si alloy, the Si melting point may be lowered to a temperature that is lower than the boiling point of Zn.

Here, in the production method of the invention, Si is added to the Zn molten metal in an amount capable of being melted at a temperature equal to or lower than the boiling point of Zn by forming an alloy with Zn.

At this time, the specific gravity of Si is 2.33, and is smaller than a specific gravity of 7.14 in Zn. Accordingly, the metal Si powder is lighter than Zn, and thus there is a concern that in the Zn molten metal, the metal Si powder floats to a liquid surface, and the metal Si powder is unevenly distributed in the vicinity of the liquid surface of the Zn molten metal. However, in the production method of the invention, the floating suppressing member is provided at the inside of the crucible in a displaceable manner, and the floating of the metal Si powder is suppressed by the floating suppressing member. Accordingly, it is possible to melt the metal Si powder without uneven distribution in the vicinity of the liquid surface of the Zn molten metal.

In addition, at this time, when the Zn molten metal is partially overheated, the temperature of the Zn molten metal exceeds the boiling point of Zn. Therefore, there is a concern that the Zn molten metal is sublimated as a gas and thus Zn is lost. However, in the production method of the invention, heating is performed in a state in which the liquid surface of the Zn molten metal is coated with the carbonaceous material, and thus it is possible to prevent the sublimation of the Zn by the carbonaceous material.

Next, when the metal Si powder is melted, the suppression of the floating of the metal Si powder by the floating suppression member is released, and the melted Si is allowed to be dispersed in the Zn molten metal. As a result, it is possible to obtain Zn—Si alloy molten metal.

Next, a casting mold is filled with the Zn—Si alloy molten metal so as to obtain a billet. At this time, as described above, the specific gravity of Si is 2.33 and is smaller than the specific gravity of 7.14 of Zn, and thus there is a concern that segregation of Si may occur. Here, in the production method of the invention, the Zn—Si alloy molten metal that is filled in the casting mold is rapidly cooled down, and thus the segregation of Si is prevented. Accordingly, it is possible to obtain Zn—Si alloy having a uniform composition.

In addition, in the production method of the invention, it is preferable that the Zn—Si alloy molten metal is put into a copper casting mold, and an outer circumferential surface of the copper casting mold is rapidly cooled through water cooling. The copper casting mold is excellent in thermal conductivity, and thus the Zn—Si alloy molten metal is likely to be well cooled, and when the outer circumferential surface is cooled down with water, the Zn—Si alloy molten metal is further likely to be cooled down. As a result, the rapid cooling can be performed in a preferred manner.

In addition, in the production method of the invention, it is preferable that the metal Si powder is added to the Zn molten metal in a range of 0.1% by mass to 4.0% by mass with respect to the total amount of the Zn—Si alloy to be obtained. When the metal Si powder in the above range is added to the Zn molten metal, it is possible to obtain the Zn—Si alloy having preferred physical properties as a brazing material.

When the amount of the metal Si powder that is added is less than 0.1% by mass with respect to the total amount of Zn—Si alloy to be obtained, it may be difficult to obtain the Zn—Si alloy having the preferred physical properties as brazing material in some cases. In addition, when the amount of the metal Si powder that is added exceeds 4.0% by mass with respect to the total amount of Zn—Si alloy to be obtained, it may be difficult to melt the metal Si powder at a temperature lower than the boiling point of Zn.

In addition, in the production method of the invention, it is more preferable that the metal Si powder is added to the Zn molten metal in a range that is equal to or more than 0.1% by mass and less than 2.0% by mass with respect to the total amount of the Zn—Si alloy to be obtained. When the amount of the metal Si powder that is added exceeds 2.0% by mass with respect to the total amount of the Zn—Si alloy to be obtained, segregation of Si may occur. Here, when the amount of the metal Si powder that is added is set to less than 2.0% by mass with respect to the total amount of the Zn—Si alloy to be obtained, the segregation of Si is reliably prevented, and thus it is possible to obtain the Zn—Si alloy having a uniform composition.

In addition, in the production method of the invention, it is preferable that the floating supporting member is formed from a material that does not react with the Zn molten metal, and includes an inner lid that is slidable along an inner circumferential surface of the crucible, and a rod that supports the inner lid and vertically moves the inner lid. When the floating supporting member has the above-described configuration, it is possible to reliably suppress the floating of the metal Si powder.

At this time, it is preferable that the inner lid have a configuration which does not transmit the metal Si powder and transmits only the Zn molten metal. As an inner lid having the above-described configuration, for example, a mesh-like body having a mesh with a diameter smaller than a diameter of the metal Si powder, or a member having a plurality of through-holes having a diameter smaller than the diameter of the metal Si powder may be used.

In addition, in the production method of the invention, as the carbonaceous material, for example, charcoal may be used.

BRIEF DESCRIPTION OF DRAWINGS

FIG. 4 is a graph illustrating Si concentration distribution in a brazing material formed from the Zn—Si alloy that is obtained by the production method of the invention.

MODE(S) FOR CARRYING OUT THE INVENTION

Next, an embodiment of the invention will be described in detail with reference to the accompanying drawings.

Figure 1:
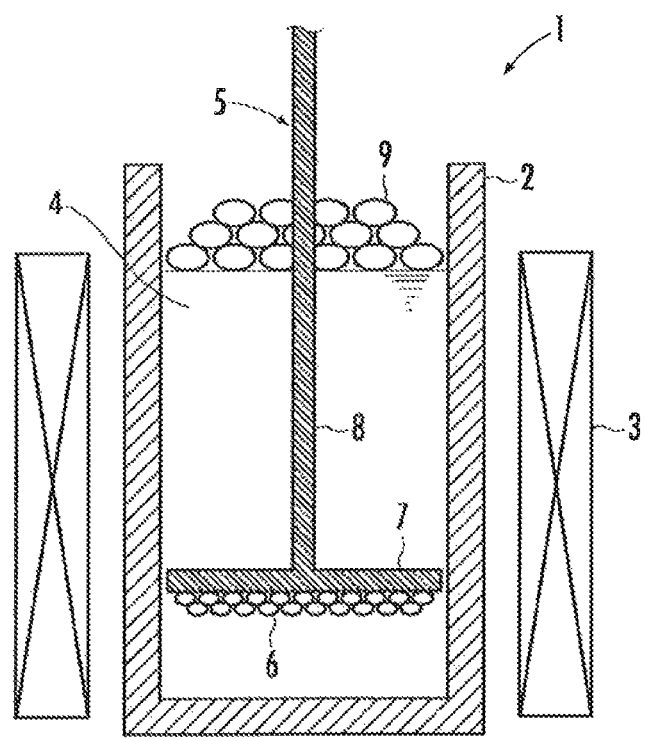
FIG. 1 is a schematic cross-sectional view illustrating a configuration of a heating furnace that is used in a production method of the invention.

In a production method of this embodiment, first, metal Zn is melted in a crucible 2 that is placed in a heating furnace 1 illustrated in FIG. 1. The heating furnace 1 is provided with an induction heating coil 3 that is disposed in a cylindrical shape, and a crucible 2 having a bottomed cylindrical shape is disposed on an inner circumference side of the induction heating coil 3 with a predetermined interval therefrom. As the crucible 2, for example, a graphite crucible can be used.

As the metal Zn, for example, metal Zn which has a purity of 99.98% and includes inevitable impurities as the remainder, can be used. The melting is performed through heating of the metal Zn, which is put into the crucible 2, by the induction heating coil 3 at a temperature that is equal to or higher than the melting point (420° C.) of Zn and is lower than the boiling point (907° C.) of Zn, for example, through heating at a melting temperature of 840° C. As a result, the metal Zn inside the crucible 2 is melted, thereby obtaining a Zn molten metal 4.

Next, a metal Si powder is added to the Zn molten metal 4 and the resultant mixture is melted. As the metal Si, for example, metal Si, which has a purity of 99.98% and includes inevitable impurities as the remainder, can be used.

Figure 2:
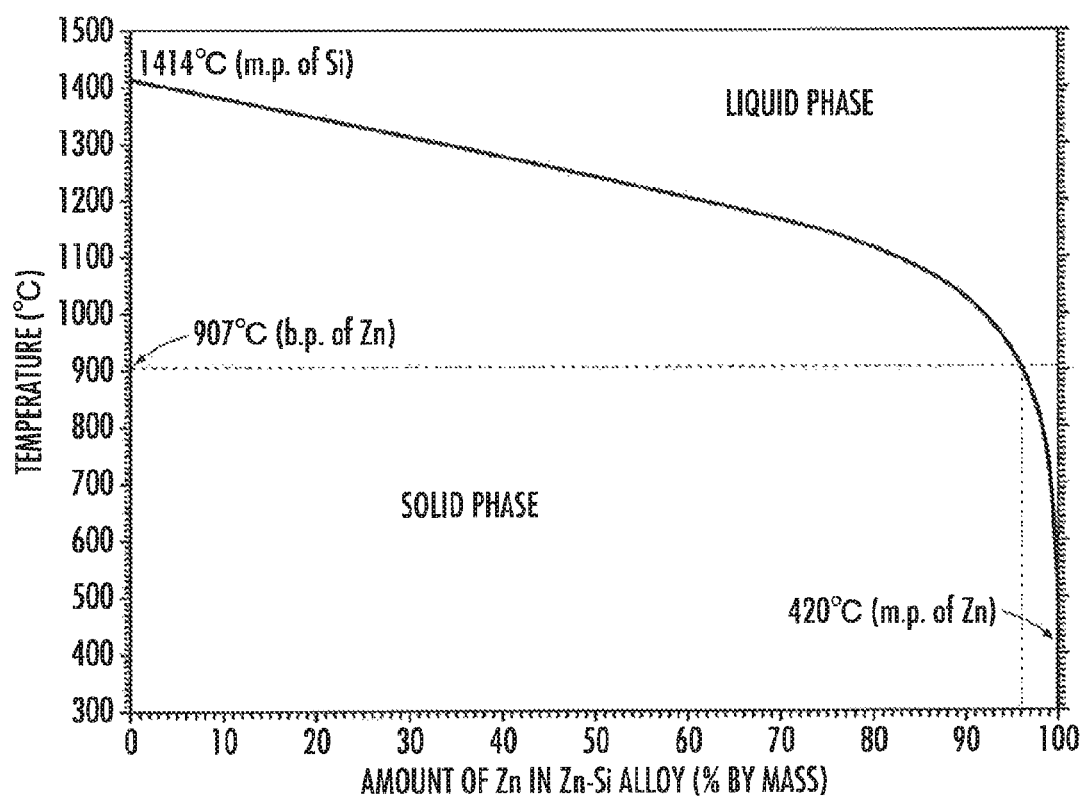
FIG. 2 is a graph illustrating a relationship between a composition and a phase of a Zn—Si alloy.

Here, the melting point of Si alone is 1414° C. However, in a Zn—Si alloy as illustrated in FIG. 2, it can be seen that the melting point may be lowered to a temperature lower than 1414° C. In addition, when an amount of the metal Si powder that is added is set to less than 4.0% by mass on the basis of the total amount of the Zn—Si alloy to be obtained, it is possible to lower the melting point of the Zn—Si alloy that is obtained to a temperature lower than the boiling point 907° C. of Zn, and it is possible to lower the melting temperature to a temperature that is equal to or lower than the boiling point of Zn.

In this example, the metal Si powder is added in an amount in a range of 0.1% by mass to 4.0% by mass on the basis of the total amount of the Zn—Si alloy that is obtained. When the amount of metal Si powder that is added exceeds 4.0% by mass on the basis of the total amount of Zn—Si alloy that is obtained, the melting temperature exceeds the boiling point of Zn, and thus Zn may be vaporized and sublimated. In addition, if the amount of the metal Si powder that is added is less than 0.1% by mass on the basis of the total amount of Zn—Si alloy that is obtained, when the obtained Zn—Si alloy is used as a brazing material, preferred physical properties as the brazing material may not be obtained in some cases.

On the other hand, even though the amount of the metal Si powder that is added is in a range of 0.1% by mass to 4.0% by mass on the basis of the total amount of the Zn—Si alloy to be obtained, when the amount of metal Si powder that is added exceeds 2.0% by mass, segregation of Si may occur and thus it may be difficult to obtain the Zn—Si alloy having a uniform composition in some cases.

With regard to the addition of the metal Si powder to the Zn molten metal 4, the specific gravity of Si is 2.33, and is smaller than the specific gravity of 7.14 in Zn. Accordingly, there is a concern that the metal Si powder floats to a liquid surface of the Zn molten metal 4, and is unevenly distributed in the vicinity of the liquid surface of the Zn molten metal 4. Here, as illustrated in FIG. 1, a floating suppressing member 5 is disposed at the inside of the crucible 2 to prevent the floating of a metal Si powder 6 that is added to the Zn molten metal 4.

The floating suppressing member 5 is provided with an inner lid 7 that is slidable along an inner circumferential surface of the crucible 2, and a rod 8 that supports the inner lid 7 and vertically moves the inner lid 7. The rod 8 is connected to a driving unit that is not illustrated in the drawing. The inner lid 7 and the rod 8 are formed from a raw material that does not react with the Zn molten metal 4. In addition, the inner lid 7 may have a configuration which does not transmit the metal Si powder 6, and transmits only the Zn molten metal 4. For example, as the inner lid 7, a mesh-like body, or a member having a plurality of through-holes having a diameter smaller than the metal Si powder 6 may be used.

According to the floating suppressing member 5, after adding the metal Si powder 6 to the Zn molten metal 4, the inner lid 7 is immersed in the crucible 2, and is pressed down with the rod 8. According to this, the metal Si powder 6 is prevented from floating and can be located on a lower side of the Zn molten metal 4. As a result, it is possible to melt the metal Si powder 6 without uneven distribution in the vicinity of the liquid surface of the Zn molten metal 4.

In addition, at this time, the liquid surface of the Zn molten metal 4 is coated with a carbonaceous material 9 such as charcoal. According to this, even when the Zn molten metal 4 is partially overheated, and thus the temperature of the Zn molten metal 4 exceeds the boiling point of Zn, it is possible to prevent the Zn molten metal 4 from being a gas and Zn from being sublimated.

Next, when the metal Si powder 6 is melted, the inner lid 7 is raised by the rod 8. According to this, the suppression of the floating of the metal Si powder 6 is released, and thus the melted Si is dispersed in the Zn molten metal 4. As a result, it is possible to obtain a Zn—Si alloy molten metal.

Figure 3:
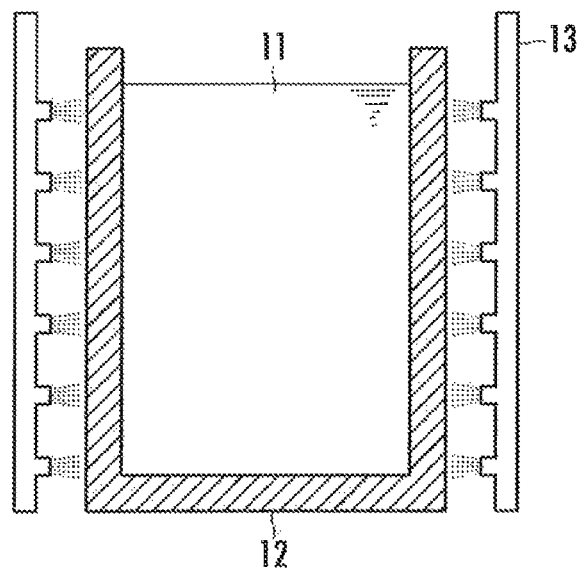
FIG. 3 is a schematic cross-sectional view illustrating a configuration of a casting mold that is used in the production method of the invention.

Next, as illustrated in FIG. 3, a copper casting mold 12 is filled with a Zn—Si alloy molten metal 11 kept to, for example, a temperature of 750° C. so as to prepare a billet. The copper casting mold 12 has a bottomed cylindrical shape, and an outer circumferential surface thereof can be cooled down with water that is sprayed from a showering device 13 that is provided along the outer circumference of the copper casting mold 12.

Here, the copper casting mold 12 is filled with the Zn—Si alloy molten metal 11, and the outer circumferential surface of the copper casting mold 12 is cooled down with water that is sprayed from the showering device 13, thereby rapidly cooling down the Zn—Si alloy molten metal 11. According to this, it is possible to prevent Si from precipitating from the Zn—Si alloy molten metal 11, and thus it is possible to obtain a Zn—Si alloy billet in which a Si concentration is uniform at respective portions. The Zn—Si alloy billet is hot-extruded from a die having a predetermined diameter, thereby obtaining a brazing material.

Next, in the production method of this embodiment, the metal Si powder 6 was added to the Zn molten metal 4 in an amount of 1.0% by mass on the basis of the total amount of a Zn—Si alloy that is to be obtained, thereby preparing the Zn—Si alloy billet. Next, the Zn—Si alloy billet was hot-extruded from a die having a diameter of 3.2 mm at a temperature of 100° C., thereby preparing a plurality of brazing materials having a diameter of 3.2 mm and a length of 2.0 m.

Three pieces were randomly extracted from the plurality of brazing materials which are prepared as described above, and Si concentrations of each of the brazing materials were measured at three sites including a front end, the center, and a rear end. FIG. 4 illustrates the Si concentrations of the three brazing materials as "Δ", "○", and "●".

From FIG. 4, it is apparent that in each of the brazing materials, the Si concentration is distributed in a range of 1.0±0.3% by mass at any of the three sites including the front end, the center, and the rear end. Accordingly, according to the production method of this embodiment, it is apparent that the Zn—Si alloy having a uniform composition and preferred physical properties as a brazing material can be obtained.

EXPLANATIONS OF LETTERS OR NUMERALS

1: Heating furnace
2: Crucible
4: Zn molten metal
5: Floating suppressing member
6: Metal Si powder
9: Carbonaceous material
11: Zn—Si alloy molten metal
12: Copper casting mold
13: Showering device

The invention claimed is:

1. A method for producing zinc alloy in which Si is contained in Zn, the method comprising:
a process of heating metal Zn in a crucible provided in a heating furnace to melt the metal Zn so as to obtain Zn molten metal;
a process of adding metal Si powder to the Zn molten metal in an amount capable of being melted at a temperature equal to or lower than a boiling point of Zn, and heating the resultant mixture to melt the metal Si powder in a state in which arising of the metal Si powder is suppressed by a floating suppressing member that is displaceable inside of the crucible, and a liquid surface of the Zn molten metal is coated with a carbonaceous material;
a process of releasing the suppression of the floating of the metal Si powder by the floating suppressing member to allow the melted Si to be dispersed in the Zn molten metal so as to obtain Zn—Si alloy molten metal; and
a process of filling a casting mold with the Zn—Si alloy molten metal, and rapidly cooling down the Zn—Si alloy molten metal so as to obtain a billet.

2. The method for producing the zinc alloy according to claim 1,
wherein the Zn—Si alloy molten metal is put into a copper casting mold, and an outer circumferential surface of the copper casting mold is rapidly cooled down through water cooling.

3. The method for producing the zinc alloy according to claim 1,
wherein the metal Si powder is added to the Zn molten metal in a range of 0.1% by mass to 4.0% by mass with respect to a total amount of the Zn—Si alloy to be obtained.

4. The method for producing the zinc alloy according to claim 3,
wherein the metal Si powder is added to the Zn molten metal in a range that is equal to or more than 0.1% by mass and less than 2.0% by mass with respect to the total amount of the Zn—Si alloy to be obtained.

5. The method for producing the zinc alloy according to claim 1,
wherein the floating supporting member is formed from a raw material that does not react with the Zn molten metal, and includes an inner lid that is slidable along an inner circumferential surface of the crucible, and a rod that supports the inner lid and vertically moves the inner lid.

6. The method for producing the zinc alloy according to claim 5,
   wherein the inner lid is constituted by a mesh-like body having a mesh smaller than a diameter of the metal Si powder.

7. The method for producing the zinc alloy according to claim 5,
   wherein the inner lid has a plurality of through-holes having a diameter smaller than a diameter of the metal Si powder.

8. The method for producing a zinc alloy according to claim 1,
   wherein the carbonaceous material is charcoal.

\* \* \* \* \*